US012743992B2

(12) United States Patent
Kim et al.

(10) Patent No.: US 12,743,992 B2
(45) Date of Patent: Sep. 22, 2026

(54) LED DISPLAY DRIVING CIRCUIT FOR COMPENSATING SHORTED LED AND DISPLAY DEVICE THEREOF

(71) Applicant: LX SEMICON CO., LTD., Daejeon (KR)

(72) Inventors: Jang Su Kim, Daejeon (KR); Jong Min Lee, Daejeon (KR); Ji Hwan Kim, Daejeon (KR); Sang Suk Kim, Daejeon (KR); Jin Ho Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/081,520

(22) Filed: Mar. 17, 2025

(65) Prior Publication Data

US 2025/0292725 A1 Sep. 18, 2025

(30) Foreign Application Priority Data

Mar. 18, 2024 (KR) ........................ 10-2024-0037414
Feb. 12, 2025 (KR) ........................ 10-2025-0018333

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2300/0814* (2013.01); *G09G 2310/0267* (2013.01); *G09G 2310/08* (2013.01); *G09G 2320/064* (2013.01); *G09G 2330/08* (2013.01)

(58) Field of Classification Search
CPC ........................................................ G09G 3/32
USPC ........................................................... 345/55
See application file for complete search history.

(56) References Cited

U.S. PATENT DOCUMENTS

2007/0120778 A1* 5/2007 Kimura ................ G09G 3/3216 345/76
2011/0181632 A1* 7/2011 Xu ....................... G09G 3/3216 345/691
2021/0272509 A1* 9/2021 Ko ....................... G09G 3/2014
2024/0046856 A1* 2/2024 Ma ........................... G09G 3/32

* cited by examiner

*Primary Examiner* — Long D Pham
(74) *Attorney, Agent, or Firm* — Birch, Stewart, Kolasch & Birch, LLP

(57) ABSTRACT

A LED display driving circuit includes a channel driving circuit configured to supply a channel current to a plurality of channel lines according to a pulse width modulation (PWM) control signal, a scan driving circuit including a plurality of scan switches connected to a plurality of scan lines and selectively turned on or off according to a scan signal to select a scan line connected to LEDs to emit light, and a plurality of precharge switches connected to the plurality of scan lines and operate complementarily with the scan switches, and a data controller configured to generate the PWM control signal, the scan signal, and the precharge control signal and maintain a target scan line in a floating state by turning off a precharge switch connected to a target scan line when a scan switch of a target scan line to which a shorted LED is connected is turned off when the shorted LED among the plurality of LEDs is detected.

19 Claims, 15 Drawing Sheets

LED DISPLAY DRIVING CIRCUIT FOR COMPENSATING SHORTED LED AND DISPLAY DEVICE THEREOF

CROSS-REFERENCE TO RELATED APPLICATIONS

This application claims the benefit of the Korean Patent Applications No. 10-2024-0037414 filed on Mar. 18, 2024 and No. 10-2025-0018333 filed on Feb. 12, 2025, which are hereby incorporated by reference as if fully set forth herein.

BACKGROUND

Field of the Invention

The present disclosure relates to a display device, and more specifically, to a light-emitting diode (LED) display.

Discussion of the Related Art

As informatization progresses, various display devices that can visualize information are being developed. Liquid crystal display (LCD) devices, organic light-emitting diode (OLED) display devices, and plasma display panel (PDP) display devices are display devices that have been developed or are being developed. These display devices are evolving to be able to properly display high-resolution images.

However, the display devices have the advantage of high resolution but have the disadvantage of being difficult to enlarge. For example, large OLED display devices developed up to the present time are 80 inches (approximately 2 m) or 100 inches (approximately 2.5 m) in size, making them unsuitable for making a large display device that is over 10 m wide.

As a way to solve this problem of enlargement, interest in LED display devices has been increasing recently. In LED display device technology, a required number of modular LED pixels can be disposed to form a single large panel. Alternatively, in LED display device technology, a required number of unit panels formed of multiple LED pixels can be disposed to form a single large panel structure. In this way, the LED display device technology makes it easy to implement large display devices by expanding and arranging LED pixels as needed.

LED display devices have the advantage of not only being able to be enlarged but also being able to diversify panel sizes. LED display device technology allows horizontal and vertical sizes to be adjusted in various ways according to an appropriate arrangement of LED pixels.

In an LED display device, when an LED of a specific pixel is shorted, there is a problem that overall brightness of normal LEDs connected to the same channel line as the shorted LED can become brighter (Bright Line) or darker (Dim Line), thereby occurring a failure of picture quality.

As a way to solve this problem, detecting and repairing the shorted LED or replacing the shorted LED with a normal LED can be considered, but there is a problem that repairing or replacing the shorted LED is costly and time-consuming.

SUMMARY

Accordingly, there is provided a light-emitting diode (LED) display driving circuit that can reduce line failures caused by shorted LEDs and an LED display device including the same.

There is also provided an LED display driving circuit that can compensate brightness of a normal LED connected to the same channel line as a shorted LED, and an LED display device including the same.

According to one aspect of the present disclosure, there is provided an LED display driving device including a channel driving circuit configured to supply a channel current to each of a plurality of channel lines according to a pulse width modulation (PWM) control signal and allow a plurality of LEDs connected to each channel line to emit light, a scan driving circuit including a plurality of scan switches connected to a plurality of scan lines and selectively turned on or off according to a scan signal to select a scan line connected to LEDs to emit light, and a plurality of precharge switches connected to the plurality of scan lines and configured to operate complementarily with the scan switches according to a precharge control signal, and turned on when each of the scan switches is turned off to supply a precharge voltage to a corresponding scan line, and a data controller configured to generate the PWM control signal, the scan signal, and the precharge control signal and maintain a target scan line in a floating state by turning off a precharge switch connected to the target scan line when the scan switch of the target scan line to which a shorted LED is connected is turned off when the shorted LED among the plurality of LEDs is detected.

According to another aspect of the present disclosure, there is provided an LED display device including a display panel including a plurality of LEDs disposed in a plurality of sub-pixels where a plurality of channel lines and a plurality of scan lines intersect, and an LED display driving circuit configured to supply channel currents to the plurality of LEDs and allow the plurality of LEDs to emit light, wherein the LED display driving circuit includes a channel driving circuit configured to supply the channel current through each channel line according to a pulse width modulation (PWM) control signal, a scan driving circuit including a plurality of scan switches connected to a plurality of scan lines and selectively turned on or off according to a scan signal to select a scan line connected to LEDs to emit light, and a plurality of precharge switches connected to the plurality of scan lines and configured to operate complementarily with the scan switches according to a precharge control signal, and turned on when each of the scan switches is turned off to supply a precharge voltage to a corresponding scan line, and a data controller configured to generate the PWM control signal, the scan signal, and the precharge control signal and maintain a target scan line in a floating state by turning off a precharge switch connected to the target scan line when the scan switch of the target scan line to which a shorted LED is connected is turned off when the shorted LED among the plurality of LEDs is detected.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
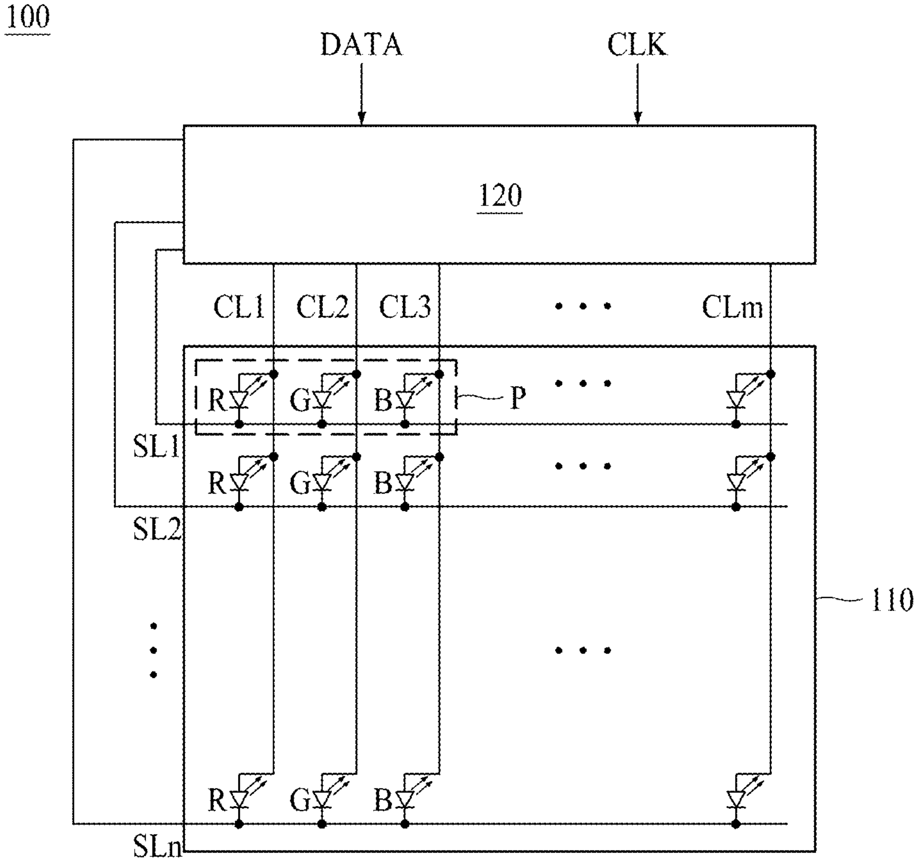
FIG. 1 is a diagram illustrating a configuration of a light-emitting diode (LED) display device according to one embodiment of the present disclosure.

Advantages and features of the present disclosure, and implementation methods thereof will be clarified through following exemplary embodiments described with reference to the accompanying drawings. The present disclosure can, however, be embodied in different forms and should not be construed as limited to the exemplary embodiments set forth herein. Rather, these exemplary embodiments are provided so that this disclosure will be thorough and complete, and will fully convey the scope of the present disclosure to those skilled in the art. Further, the present disclosure is only defined by scopes of claims.

Throughout the present disclosure, identical reference numerals refer to substantially identical elements. In the following description, when the detailed description of the relevant known function or configuration is determined to unnecessarily obscure the important point of the present disclosure, the detailed description will be omitted. In addition, the names of the elements used in the description below are examples and can differ from the names of the actual product corresponding to the elements.

In a case where 'comprise,' 'have,' and 'include' described in the present disclosure are used, another part can be added. The terms of a singular form can include plural forms unless referred to the contrary.

In construing an element, the element is construed as including an error range although there is no explicit description.

It will be understood that, although the terms "first", "second", etc. can be used herein to describe various elements, these elements should not be limited by these terms. These terms are only used to distinguish one element from another. Accordingly, a first element mentioned hereinafter could be termed a second element without departing from the scope of the present disclosure.

The term "at least one" should be understood as including any and all combinations of one or more of the associated listed items. For example, the meaning of "at least one of a first item, a second item, and a third item" denotes each of the first item, the second item, and the third item as well as the combination of all items proposed from two or more of the first item, the second item, and the third item.

Features of various exemplary embodiments of the present disclosure can be partially or overall coupled to or combined with each other and can be variously interoperated or combined with each other and driven technically as those skilled in the art can sufficiently understand. The exemplary embodiments of the present disclosure can be carried out independently from each other, or can be carried out together in co-dependent relationship.

Hereinafter, exemplary embodiments of the present disclosure will be described in detail with reference to the accompanying drawings.

FIG. 1 is a diagram illustrating a configuration of a light-emitting diode (LED) display device according to one embodiment of the present disclosure.

As shown in FIG. 1, an LED display device 100 according to one embodiment of the present disclosure includes a display panel 110 and an LED display driving circuit 120.

The display panel 110 can include a plurality of pixels P. The plurality of pixels P can be disposed in the form of a matrix in a first direction (e.g., a horizontal direction of FIG. 1) and a second direction (e.g., a vertical direction of FIG. 1). At least one LED can be disposed in each pixel P, and brightness of the pixel P can be determined according to brightness of the LED. That is, the display panel 110 can be an LED display panel.

Each pixel P can include a plurality of sub-pixels. For example, each pixel P can include three sub-pixels. Each pixel P can include a red sub-pixel emitting red light, a green sub-pixel emitting green light, and a blue sub-pixel emitting blue light. One LED can be disposed in each sub-pixel.

A plurality of channel lines CL1 to CLm and a plurality of scan lines SL1 to SLn are disposed in the display panel 110. Each sub-pixel can be disposed in a region where a channel line and a scan line intersect. That is, the LED disposed in each sub-pixel can be electrically connected to one of the channel lines CL1 to CLm and one of the scan lines SL1 to SLn.

The channel lines CL1 to CLm can connect one sides of the sub-pixels in the second direction, and the scan lines SL1 to SLn can connect the other sides of the sub-pixels in the first direction. For example, anodes of LEDs disposed in the sub-pixels can be electrically connected to the channel lines CL1 to CLm, and cathodes of the LEDs can be electrically connected to the scan lines SL1 to SLn. The example shown in FIG. 1 is also referred to as a common cathode structure because the cathodes of the LEDs are commonly connected, but the present disclosure is not limited to this structure.

The LED display driving circuit 120 supplies a channel current to the plurality of LEDs included in the display panel 110 to cause the plurality of LEDs to emit light. In one embodiment, the LED can be driven in a pulse width modulation (PWM) manner, and the LED display driving circuit 120 can perform PWM control on each pixel P according to image data DATA received from an external component.

A gradation value for each pixel P can be included in the image data DATA, and the LED display driving circuit 120 can receive image data DATA from an external component according to a clock CLK and obtain the gradation value for each pixel P from the image data DATA.

The LED display driving circuit 120 can determine a PWM control time for the LED disposed in each sub-pixel according to the gradation value and perform PWM control on each LED. As described above, when the LED is driven in the PWM manner, brightness of the LED can be determined according to a ratio of a turn-on time to the PWM control time. Accordingly, the LED display driving circuit 120 can control the brightness of the LED by controlling the turn-on time in the PWM control time.

Specifically, brightness of an LED disposed in each sub-pixel can be determined according to an amount of a channel current supplied through one of the channel lines CL1 to CLm to which the corresponding LED is connected. When an LED is turned on by a channel current, a forward voltage can be applied to the LED. When the product of the forward voltage and the channel current is accumulated over the turn-on time within the PWM control time, a driving power amount supplied to the LED is obtained, and the brightness of the LED can be determined according to the driving power amount.

Hereinafter, an LED display driving circuit according to the present disclosure will be described with reference to FIG. 2.

Figure 2:
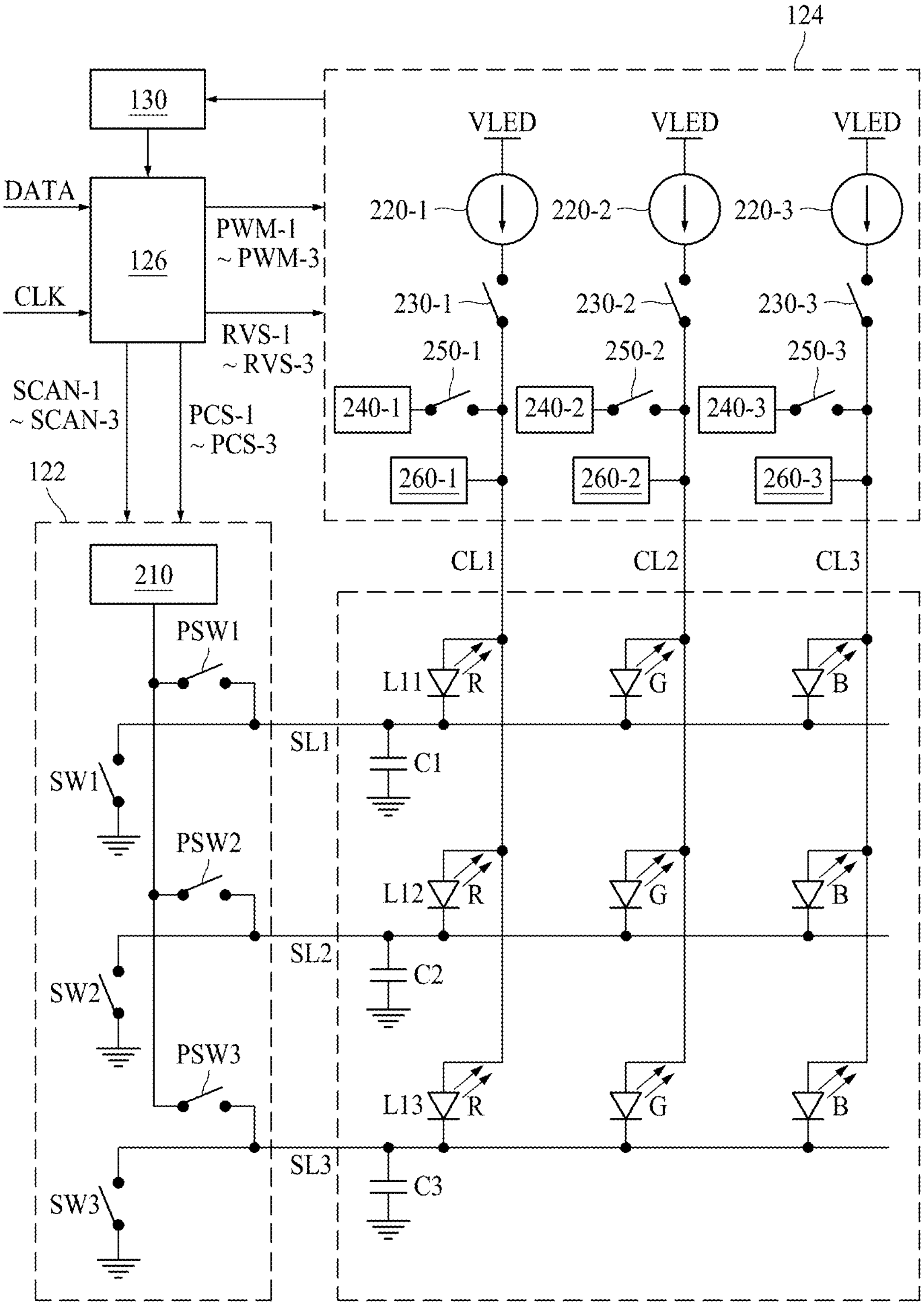
FIG. 2 is a schematic diagram illustrating a configuration of an LED display driving circuit according to one embodiment of the present disclosure.

FIG. 2 is a schematic diagram illustrating a configuration of an LED display driving circuit according to one embodiment of the present disclosure. For convenience of description, in FIG. 2, the display panel 110 is shown as including three scan lines SL1 to SL3, three channel lines CL1 to CL3, and nine LEDs.

As shown in FIG. 2, the LED display driving circuit 120 can include a scan driving circuit 122, a channel driving circuit 124, and a data controller 126.

The scan driving circuit 122 is connected to the plurality of scan lines SL1 to SL3 and drives the scan lines SL1 to SL3 according to scan signals SCAN_1 to SCAN_3 supplied from the data controller 126. To this end, as shown in FIG. 2, the scan driving circuit 122 includes a plurality of scan switches SW1 to SW3.

In FIG. 2, since the display panel 110 is shown as including only three scan lines SL1 to SL3, the scan driving circuit 122 is shown as including only three scan switches SW1 to SW3. However, when the display panel 110 includes n scan lines SL1 to SLn, the scan driving circuit 122 can include n scan switches SW1 to SWn.

The plurality of scan switches SW1 to SW3 are connected to the scan lines SL1 to SL3, respectively. The plurality of scan switches SW1 to SW3 are selectively turned on or off according to the scan signals SCAN_1 to SCAN_3 supplied from the data controller 126. The scan lines SL1 to SL3 can each be connected to a low voltage part of the LED display device 100, such as a ground (GND) level, as the corresponding scan switches SW1 to SW3 are turned on according to the supply of the scan signals SCAN_1 to SCAN_3.

As the scan switches SW1 to SW3 are selectively turned on or off according to the scan signals SCAN_1 to SCAN_3, the scan lines SL1 to SL3 to which the channel current is to be supplied among the plurality of scan lines SL1 to SL3 are determined.

In the above-described example, although the scan switches SW1 to SW3 are described as being formed within the LED display driving circuit 120, in another example, the scan switches SW1 to SW3 can be formed in the display panel 110 or formed on a separate substrate.

Figure 3:
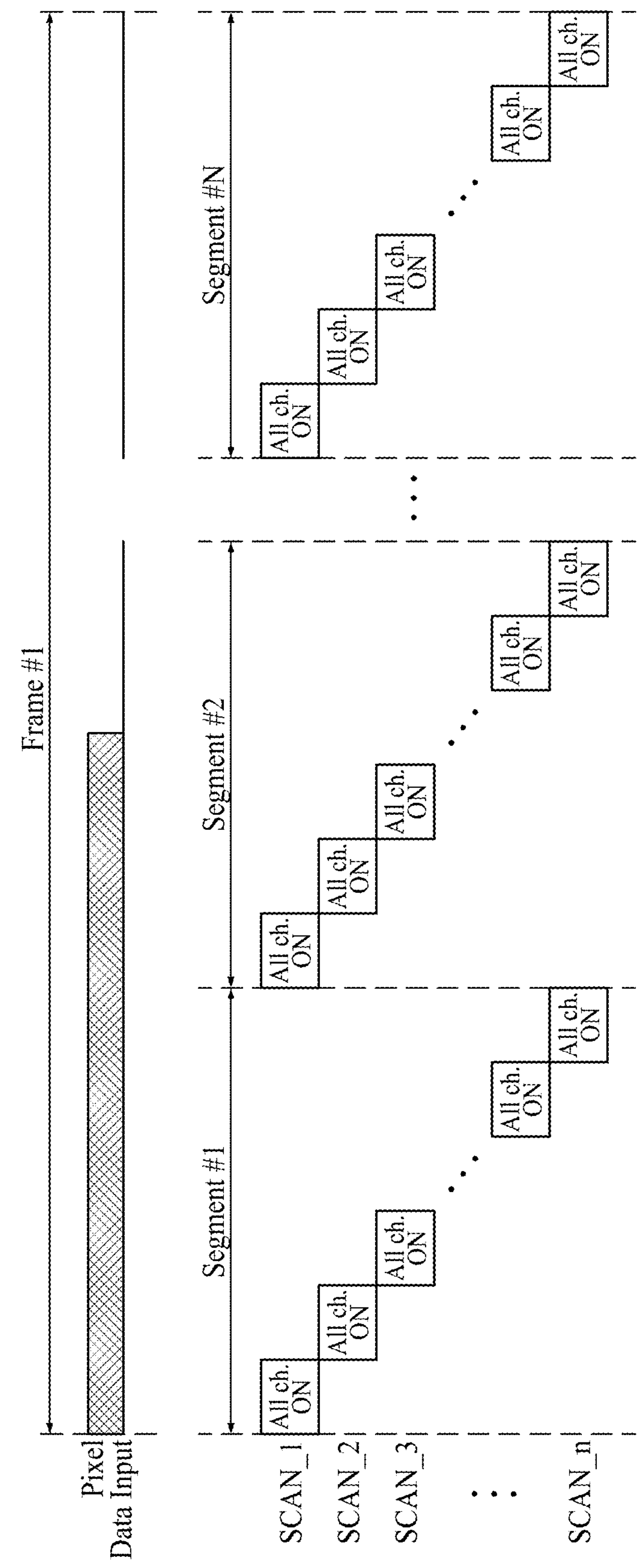
FIG. 3 is a diagram illustrating a waveform of a scan signal in the LED display device according to one embodiment of the present disclosure.

FIG. 3 is a diagram illustrating a waveform of a scan signal in the LED display device according to one embodiment of the present disclosure.

Referring to FIGS. 1 and 3, one frame is formed of N segments (N is a natural number) and scan signals SCAN_1 to SCAN_n can be sequentially supplied to the scan switches SW1 to SWn for each segment unit. Here, a frame can be each image that constitutes an image, and one segment can be a unit in which one cycle of a scanning operation is performed.

According to the scan signals SCAN_1 to SCAN_n, the first scan line SL1 to the $n^{th}$ scan line SLn can be sequentially driven. However, according to examples, the order of the scan operation cannot be sequential from the first scan line SL1 to the $n^{th}$ scan line SLn. For example, the order of the scan operation can be determined by considering a printed circuit board (PCB) routing.

In one embodiment, when each sub-pixel is PWM controlled once in one frame, the gradation value can be converted directly into a PWM control value, and each sub-pixel can be controlled according to the PWM control value. On the other hand, when one frame is divided into N segments, the gradation value is divided into N segments and allocated, and the PWM control value can be determined according to the gradation value assigned to each segment. In this case, each sub-pixel can be controlled according to the PWM control value converted according to the gradation value assigned to each segment.

Referring to FIG. 2 again, the scan driving circuit 122 according to the present disclosure can further include a precharge voltage supply 210 and precharge switches PSW1 to PSW3. In FIG. 2, since the display panel 110 is shown as including only three scan lines SL1 to SL3, the scan driving circuit 122 is shown as including only three precharge switches PSW1 to PSW3. However, when the display panel 110 includes n scan lines SL1 to SLn, the scan driving circuit 122 can include n precharge switches PSW1 to PSWn.

The precharge voltage supply 210 supplies precharge voltages Vprecharge to the scan lines SL1 to SL3 where the scan operations have ended to prevent occurrence of ghost phenomena in which the LEDs connected to the scan lines SL1 to SL3 where the scan operations have ended emit light. The precharge is an operation of charging capacitors C1 to C3 connected to the scan lines SL1 to SL3 whose scan operations have ended before scan operations of other scan lines SL1 to SL3 start. The precharge can be performed between a time point where the scan operation ends and a time point where a next scan operation starts.

Since the precharge voltage supply 210 precharges the capacitors C1 to C3, voltages of the capacitors C1 to C3 can increase. Accordingly, the LEDs connected to the capacitors C1 to C3 are maintained in a reverse bias state, and thus no current can flow in the LEDs. Thus, the LEDs connected to the capacitors C1 to C3 of the scan lines SL1 to SL3 where the scan operations have ended cannot emit light.

In this case, the capacitors C1 to C3 can be parasitic capacitors of the LEDs. The capacitors C1 to C3 can be capacitors that form electrostatic capacitance inside the LED display device 100 according to the operation of the LED display driving circuit 120 or the display panel 110. The capacitors C1 to C3 can be virtual capacitors rather than physical capacitors.

The capacitors C1 to C3 form electrostatic capacitance between the LEDs and the scan switches SW1 to SW3. Although the display panel 110 is shown as including the three capacitors C1 to C3 in FIG. 2, when the display panel 110 includes n scan lines SL1 to SLn, the display panel 110 can include n capacitors C1 to Cn.

The precharge switches PSW1 to PSW3 are selectively turned on or off by precharge control signals PCS_1 to PCS_3 generated by the data controller 126, thereby supplying precharge voltages to the scan lines SL1 to SL3. When the precharge switches PSW1 to PSW3 are turned on by the precharge control signals PCS_1 to PCS_3, the corresponding scan lines SL1 to SL3 are connected to the precharge voltage supply 210, and thus the capacitors C1 to C3 of the corresponding scan lines SL1 to SL3 are charged with the precharge voltages.

Hereinafter, the scan operation and precharge operation performed in the first scan line SL1 will be briefly described with reference to FIG. 4.

Figure 4:
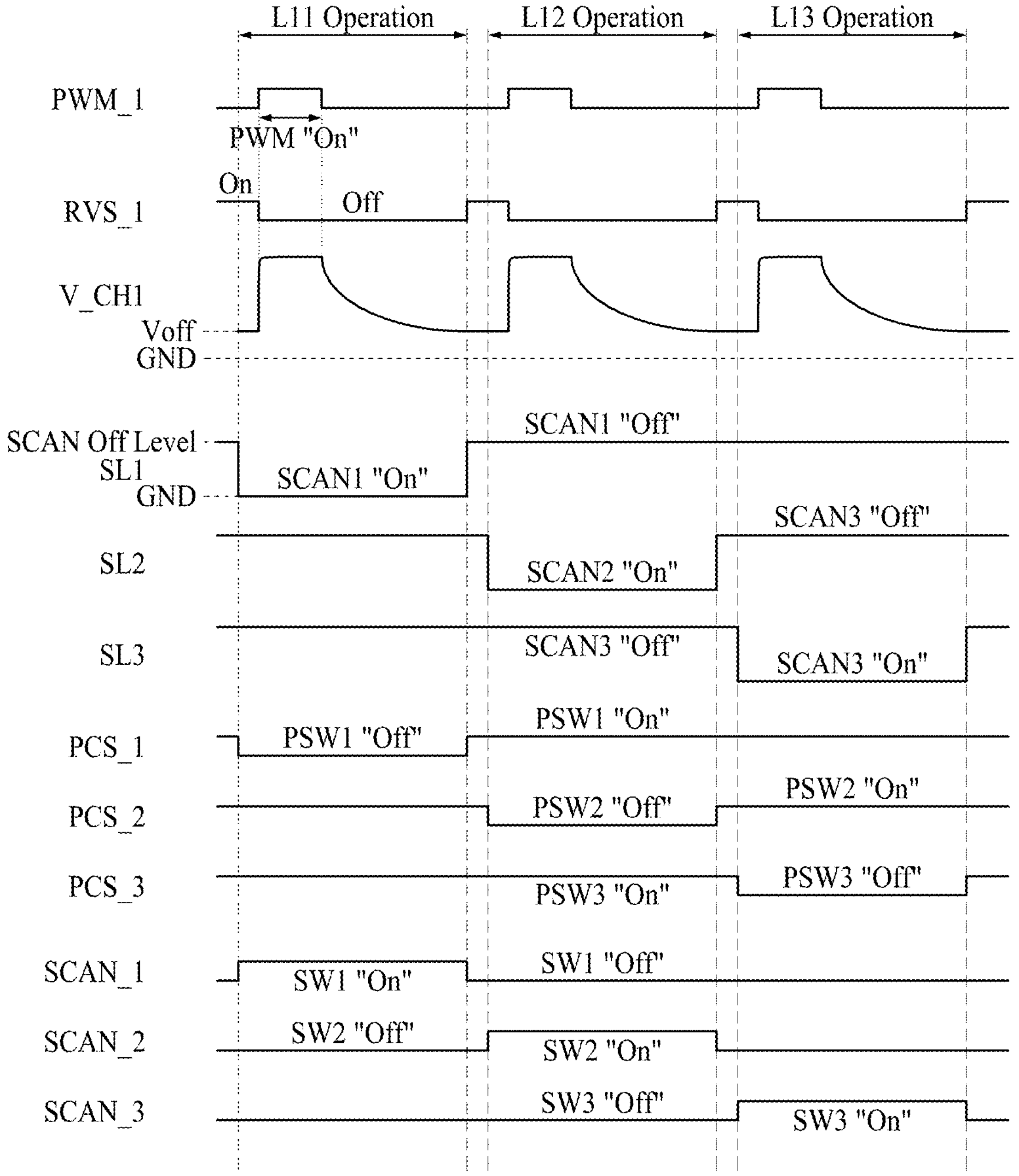
FIG. 4 is a timing diagram illustrating operation timings of some components of a normal LED display device shown in FIG. 3.

FIG. 4 is a timing diagram illustrating an operation timing of each component of the LED display device shown in FIG. 3.

As shown in FIG. 4, the first scan switch SW1 is turned on according to the first scan signal SCAN_1, and thus the first scan line SL1 is connected to a ground. In this case, the first precharge switch PSW1 is turned off according to the first precharge control signal PCS_1. Accordingly, a voltage of the first capacitor C1 disposed on the first scan line SL1 can decrease from a time point where the first scan switch SW1 is turned on and then can be maintained at a minimum value until a time point where the first scan switch SW1 is turned off.

Thereafter, the first scan switch SW1 is turned off according to the first scan signal SCAN_1, and thus the first scan line SL1 is maintained at a scan off level, and after a predetermined time elapses, the second scan switch SW2 is turned on according to the second scan signal SCAN_2. In this case, the second scan switch SW2 being turned on after a predetermined time elapses from the time point of the turn-off point of the first scan switch SW1 is to prevent the LEDs connected to the first and second scan lines SL1 and SL2 from emitting light simultaneously due to the overlapping operation of the first scan line SL1 and the second scan line SL2.

Meanwhile, the first scan switch SW1 is turned off and the first precharge switch PSW1 is simultaneously turned on by the first precharge control signal PCS_1, and thus the first capacitor C1 connected to the first scan line SL1 is charged with the precharge voltage. As a charge amount of the first capacitor C1 increases, a voltage of the first capacitor C1 can increase. The voltage of the first capacitor C1 can reach a maximum value before a time point where the second scan switch SW2 is turned on and then can be maintained at the maximum value until the first scan line SL1 is driven again.

That is, the first capacitor C1 can be precharged between the time point where the first scan switch SW1 is turned off and the time point where the second scan switch SW2 is turned on, and as the first capacitor C1 is precharged, the voltage of the first capacitor C1 maintains the maximum value, and thus the LEDs connected to the first capacitor C1 maintain a reverse bias state so that a ghost phenomenon can be prevented.

Thereafter, the second scan switch SW2 is turned on according to the second scan signal SCAN_2, and thus the second scan line SL2 is connected to the ground. In this case, the second precharge switch PSW2 is turned off according to the second precharge control signal PCS_2. Accordingly, a voltage of the second capacitor C2 disposed on the second scan line SL2 can decrease from a time point where the second scan switch SW2 is turned on and then can be maintained at a minimum value until a time point where the second scan switch SW2 is turned off.

Thereafter, the second scan switch SW2 is turned off according to the second scan signal SCAN_2, and thus the second scan line SL2 is maintained at a scan off level, and after a predetermined time elapses, the third scan switch SW3 is turned on according to the third scan signal SCAN_3.

Meanwhile, the second scan switch SW2 is turned off and the second precharge switch PSW2 is simultaneously turned on by the second precharge control signal PCS_2, and thus the second capacitor C2 connected to the second scan line SL2 is charged with the precharge voltage. As a charge amount of the second capacitor C2 increases, a voltage of the second capacitor C2 can increase. The voltage of the second capacitor C2 can reach a maximum value before a time point where the third scan switch SW3 is turned on and then can be maintained at the maximum value until the second scan line SL2 is driven again.

That is, the second capacitor C2 can be precharged between the time point where the second scan switch SW2 is turned off and the time point where the third scan switch SW3 is turned on, and as the second capacitor C2 is precharged, the voltage of the second capacitor C2 maintains the maximum value, and thus the LEDs connected to the second capacitor C2 maintain a reverse bias state so that a ghost phenomenon can be prevented.

Thereafter, the third scan switch SW3 is turned on according to the third scan signal SCAN_3, and thus the third scan line SL3 is connected to the ground. In this case, the third precharge switch PSW3 is turned off according to the third precharge control signal PCS_3. Accordingly, a voltage of the third capacitor C3 disposed on the third scan line SL3 can decrease from a time point where the third scan switch SW3 is turned on and then can be maintained at a minimum value until a time point where the third scan switch SW3 is turned off.

Thereafter, the third scan switch SW3 is turned off according to the third scan signal SCAN_3, and thus the third scan line SL3 is maintained at a scan off level, and after a predetermined time elapses, a fourth scan switch SW4 is turned on according to a fourth scan signal SCAN_4.

Meanwhile, the third scan switch SW3 is turned off and the third precharge switch PSW3 is simultaneously turned on by the third precharge control signal PCS_3, and thus the third capacitor C3 connected to the third scan line SL3 is charged with the precharge voltage. As a charge amount of the third capacitor C3 increases, a voltage of the third capacitor C3 can increase. The voltage of the third capacitor C3 can reach a maximum value before a time point where the fourth scan switch SW4 is turned on and then can be maintained at the maximum value until the third scan line SL3 is driven again.

That is, the third capacitor C3 can be precharged between the time point where the third scan switch SW3 is turned off and the time point where the fourth scan switch SW4 is turned on, and as the third capacitor C3 is precharged, the voltage of the third capacitor C3 maintains the maximum value, and thus the LEDs connected to the third capacitor C3 maintain a reverse bias state so that a ghost phenomenon can be prevented.

Referring to FIG. 2 again, the channel driving circuit 124 is connected to the plurality of channel lines CL1 to CLm and supplies a channel current to the sub-pixels connected to each of the channel lines CL1 to CLm through each of the channel lines CL1 to CLm. In this case, the channel driving circuit 124 can control an amount of the channel current supplied to the LEDs connected to each of the channel lines CL1 to CLm according to PWM control signals PWM_1 to PWM_m supplied from the data controller 126.

To this end, the channel driving circuit 124 can include channel current sources 220_1 to 220_*m* and PWM switches 230_1 to 230_*m* for the channel lines CL1 to CLm.

For convenience of description, only three channel lines CL1 to CL3 included in the display panel 110 are shown in FIG. 2, and therefore the channel driving circuit 124 is shown as including the first to third channel current sources 220_1 to 220_3 and the first to third PWM switches 230_1 to 230_3. However, when the display panel 110 includes m channel lines CL1 to CLm, the channel driving circuit 124 can include m channel current sources 220_1 to 220_*m* and m PWM switches 230_1 to 230_*m*.

Operations of the first to third channel current sources 220_1 to 220_3 are identical to each other, and operations of the first to third PWM switches 230_1 to 230_*m* are identical to each other, and thus only the operations of the first channel current source 220_1 and the first PWM switch 230_1 will be described below.

The first channel current source 220_1 can generate a channel current using an externally supplied LED driving voltage VLED. The channel current generated from the first channel current source 220_1 can be supplied to the LEDs connected to the first channel line CL1 through the first channel line CL1. The first channel current source 220_1 can be connected in series between a supply line of the LED driving voltage VLED and the first PWM switch 230_1.

The first PWM switch 230_1 is selectively turned on or off according to the first PWM control signal PWM_1 received from the data controller 126, thereby controlling a time for which the channel current is supplied through the first channel line CL1. An amount of the channel current supplied through the first channel line CL1 can be determined according to a time that the first PWM switch 230_1 is turned on. Accordingly, brightness of the LEDs connected to the first channel line CL1 can be determined.

As shown in FIG. 4, the first PWM control signal PWM_1 can include an ON period and an OFF period (corresponding to a period excluding the ON period). The first PWM switch 230_1 is turned on in the ON period of the first PWM control signal PWM_1 to supply the channel current supplied from the first channel current source 220_1 to the first channel line CL1 and is turned off in the OFF period of the first PWM control signal PWM_1 to block the channel current supplied from the first channel current source 220_1 from being supplied to the first channel line CL1.

The first PWM switch 230_1 can be connected in series between the LED and the first channel current source 210_1.

In one embodiment, as shown in FIG. 4, while the scan lines SL1 to SL3 are driven, when the first PWM switch 203_1 is turned on and thus a channel current is supplied to the first channel line CL1, a first channel voltage V_CH1 applied to the first channel line CL1 can increase from a level of a reference voltage VOFF higher than a level of the ground GND, and when the first PWM switch 203_1 is turned off and the supply of channel current is stopped, the first channel voltage V_CH1 can decrease to the level of the reference voltage VOFF again.

In the present disclosure, the reason why the first channel voltage V_CH1 applied to the first channel line CL1 is maintained at the level of the reference voltage VOFF higher than the level of the ground GND level when each of the scan lines SL1 to SL3 is driven is for reducing a time taken for the first channel voltage V_CH1 of the first channel line CL1 to increase to a maximum value according to the supply of the channel current.

To this end, as shown in FIG. 2, the channel driving circuit 124 according to the present disclosure can additionally include a first reference voltage generation circuit 240_1 for generating the reference voltage VOFF, and a first reference voltage application switch 250_1 for selectively applying the reference voltage VOFF to the first channel line CL1. In this case, the first reference voltage application switch 250_1 can be selectively turned on or off according to a first reference voltage application signal RVS_1 transmitted from the data controller 126.

For convenience of description, only three channel lines CL1 to CL3 included in the display panel 110 are shown in FIG. 2, and therefore the channel driving circuit 124 is shown as including the first to third reference voltage generation circuits 240_1 to 240_3 and the first to third reference voltage application switches 250_1 to 250_3. However, when the display panel 110 includes m channel lines CL1 to CLm, the channel driving circuit 124 can include m reference voltage generation circuits 240_1 to 240_*m* and m reference voltage application switches 250_1 to 250_*m*.

The data controller 216 can generate the scan signals SCAN_1 to SCAN_n, the PWM control signals PWM_1 to PWM_m, the precharge control signals PCS_1 to PCS_n, and the reference voltage application signals RVS_1 to RVS_m. The data controller 216 applies the scan signals SCAN_1 to SCAN_n and the precharge control signals PCS_1 to PCS_n to the scan driving circuit 122 and applies the PWM control signals PWM_1 to PWM_m and the reference voltage application signals RVS_1 to RVS_m to the channel driving circuit 124.

In one embodiment, the data controller 216 can adjust lengths of ON periods of the PWM control signals PWM_1 to PWM_m according to an internal clock GCLK. The data controller 216 can adjust the lengths of the ON periods of the PWM control signals PWM_1 to PWM_m by matching one unit of the gradation value to one period of the internal clock GCLK. For example, when the gradation value is 1, the lengths of the ON periods of the PWM control signals PWM_1 to PWM_m can be equal to one period of the internal clock GCLK.

Figure 5A:
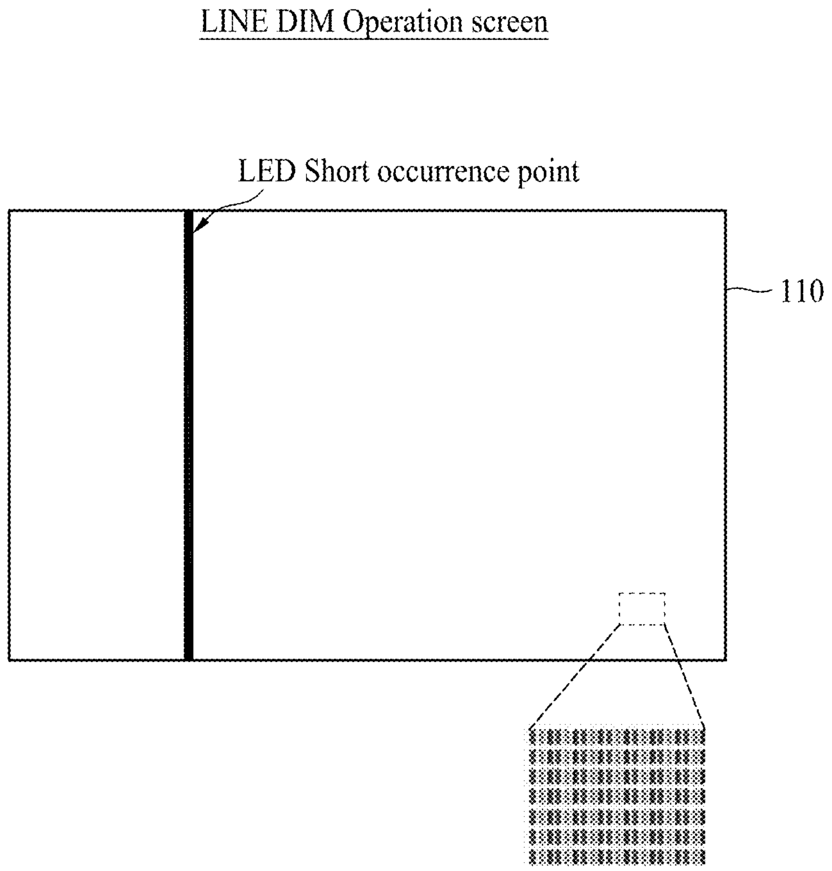
FIGS. 5A and 5B are diagrams illustrating a line defect phenomenon caused by a shorted LED.
Figure 5B:
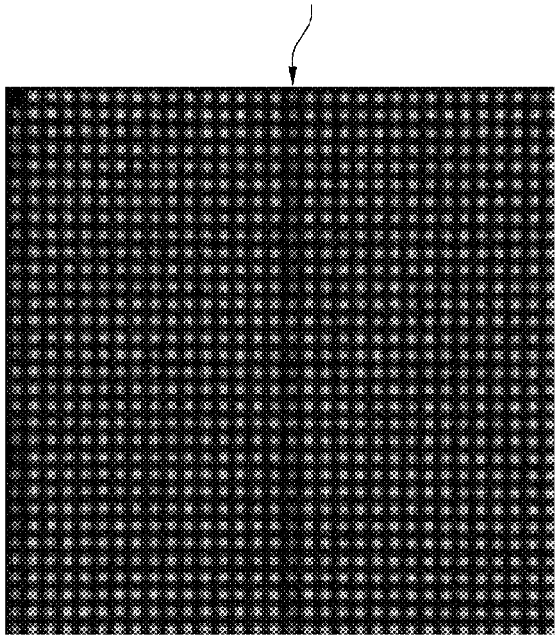

In the LED display device 100, when any one of the plurality of LEDs included in the display panel 110 is shorted, as shown in FIGS. 5A and 5B, a line defect phenomenon in which the brightness of all the LEDs connected to the corresponding channel line becomes bright or dim can occur.

Figure 6A:
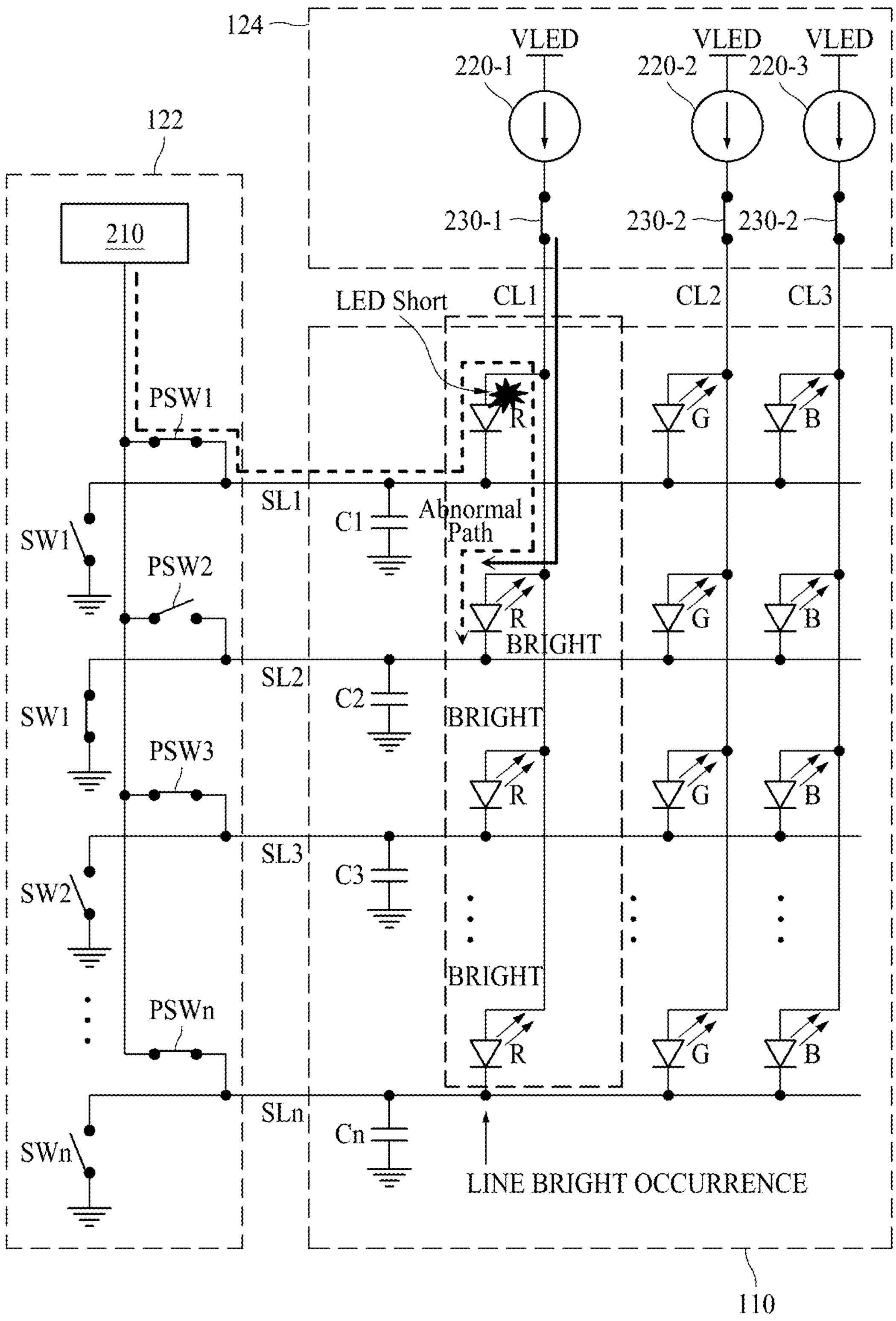
FIG. 6A is a diagram illustrating a phenomenon in which all LEDs connected to a first channel line to which the shorted LED is connected become bright (Bright Line) when a level of a precharge voltage is higher than that of a first channel voltage of the first channel line.

Specifically, as shown in FIG. 6A, when a first LED L11 connected to the first channel line CL1 and the first scan line SL1 is shorted and a level of the precharge voltage is higher than the first channel voltage V_CH1 of the first channel line CL1, and when second to $n^{th}$ LEDs L12 to L1*n* connected to the first channel line CL1 emit light, since the precharge voltage supplied through the first scan line SL1 is also supplied to the second to $n^{th}$ LEDs L12 to L1*n* through the shorted first LED L11, a phenomenon in which all the LEDs connected to the first channel line CL1 become bright (Bright Line) occurs.

Figure 6B:
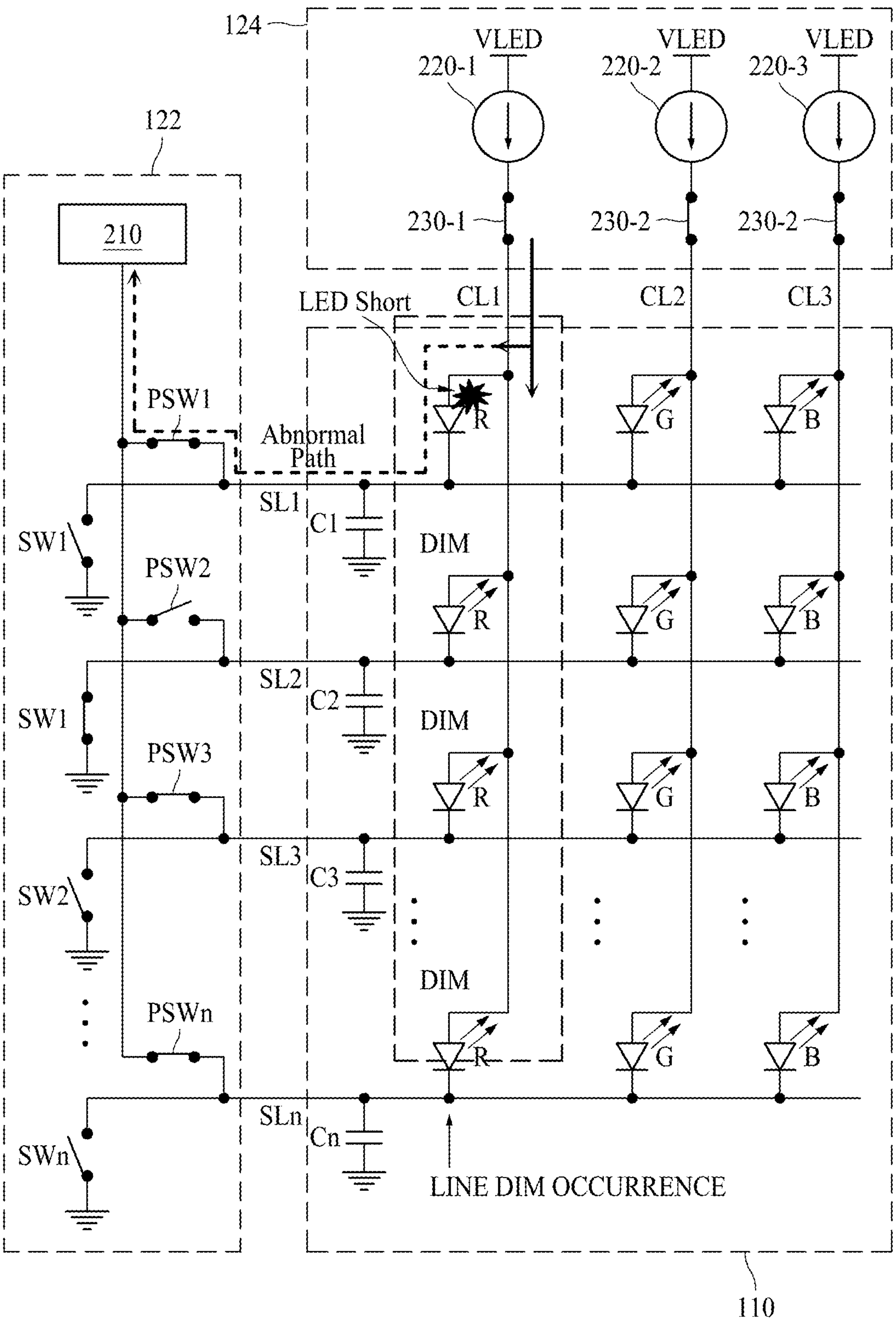
FIG. 6B is a diagram illustrating a phenomenon in which all LEDs connected to a first channel line to which the shorted LED is connected become dim (Dim Line) when the level of the precharge voltage is lower than that of the first channel voltage of the first channel line.

As another example, as shown in FIG. 6B, when the first LED L11 connected to the first channel line CL1 and the first scan line SL1 is shorted and the level of the precharge voltage is lower than the first channel voltage V_CH1 of the first channel line CL1, and when the second to $n^{th}$ LEDs L12 to L1*n* connected to the first channel line CL1 emit light, since the channel current that should be supplied through the first channel line CL1 is discharged through the shorted first LED L11, a phenomenon in which all the LEDs connected to the first channel line CL1 become dim (Dim Line) occurs.

Therefore, in order to reduce image defects due to the above shorted LED, the LED display driving circuit 120 according to the present disclosure can further include short detection circuits 260_1 to 260_3 as shown in FIG. 2.

In FIG. 2, the short detection circuits 260_1 to 260_3 are shown as being disposed for the channel lines CL1 to CL3, respectively, but this is merely an example. One short detection circuit can be commonly connected to all the channel lines CL1 to CL3 to detect a shorted LED for each of the channel lines CL1 to CL3. According to this example, the short detection circuit can be included in the channel driving circuit 124 or implemented in a separate component from the channel driving circuit 124.

The short detection circuits 260_1 to 260_3 detect shorted LEDs among the plurality of LEDs included in the display panel 110. In an embodiment, the short detection circuits 260_1 to 260_3 can determine whether each of the LEDs is shorted using a channel voltage generated as the channel currents are supplied to the LEDs connected to the scan lines SL1 to SL3 selected by the scan driving circuit 122 through the channel lines CL1 to CL3. For example, the short detection circuits 260_1 to 260_3 can detect LEDs having channel voltages that are lower than a predetermined reference voltage as shorted LEDs.

When the shorted LEDs are detected, the short detection circuits 260_1 to 260_3 can generate and store location information of the shorted LEDs on the basis of information of the scan lines SL1 to SL3 and the channel lines CL1 to CL3 to which the shorted LEDs are connected. For example, the short detection circuits 260_1 to 260_3 can generate and store location information of a shorted LED as (1,1) when the shorted LED is connected to the first scan line SL1 and the first channel line CL1. Hereinafter, for convenience of description, the scan line to which the shorted LED is connected is denoted as a target scan line, and the channel line to which the shorted LED is connected is denoted as a target channel line.

The short detection circuits 260_1 to 260_3 can provide the location information of the shorted LEDs to the data controller 126. Hereinafter, for convenience of description, it is assumed that the first LED L11 connected to the first scan line SL1 and the first channel line CL1 is shorted. According to this example, the first scan line SL1 becomes a target scan line, and the first channel line CL1 becomes a target channel line.

When driving of the target scan line SL1 to which the shorted LED L11 is connected is terminated, the data controller 126 can float the target scan line SL1 on the basis of the location information of the shorted LED L11 transmitted from the short detection circuits 260_1 to 260_3. To this end, as shown in FIG. 7, when a light emission period of the shorted LED L11 ends and thus a scan switch of the target scan line SL1 to which the shorted LED L11 is connected is turned off again, the data controller 126 generates a precharge control signal PCS_1 for turning off the first precharge switch PSW1 connected to the target scan line SL1 and applies the precharge control signal PCS_1 to the first precharge switch PSW1.

Figure 7:
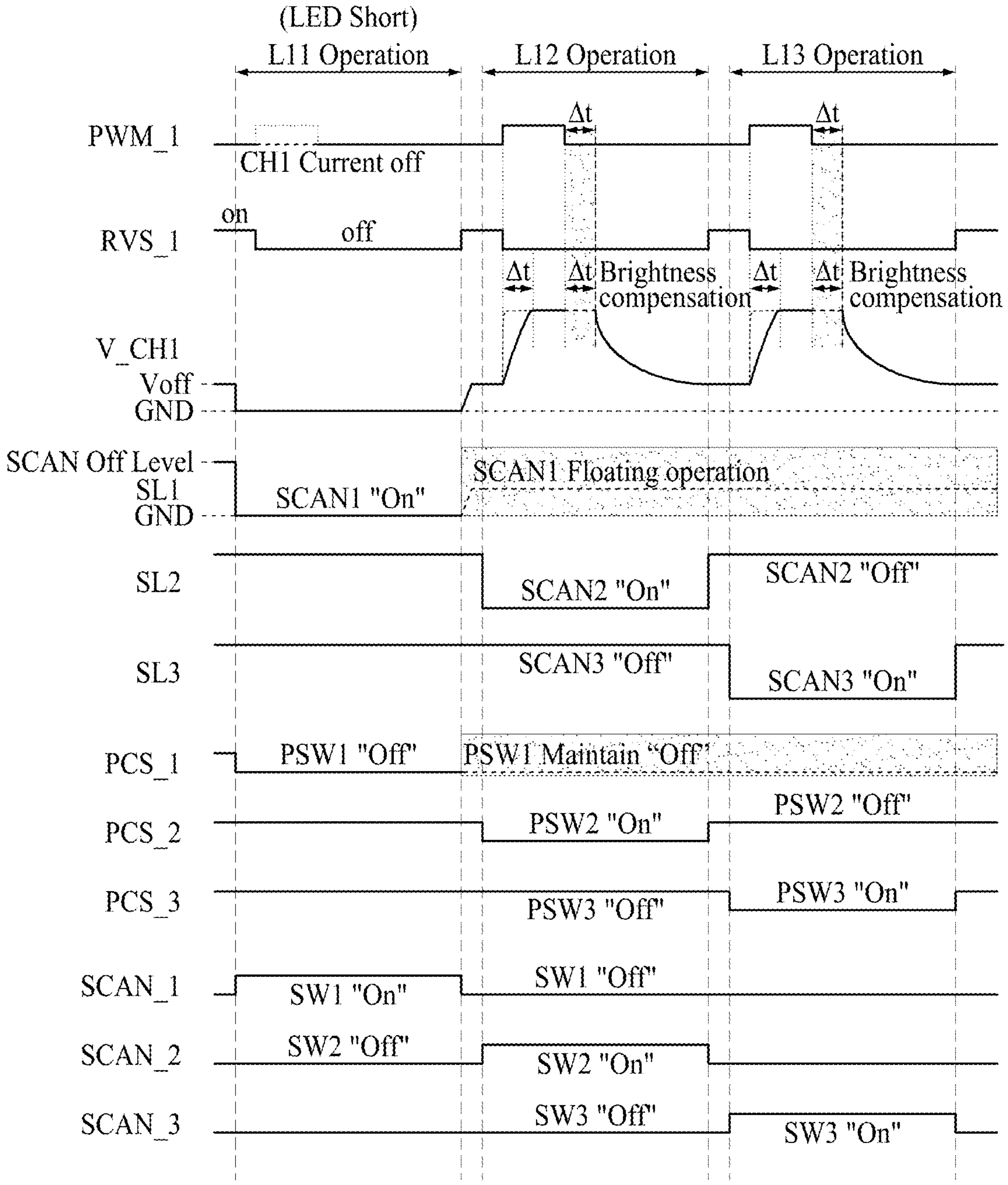
FIG. 7 is a timing diagram illustrating operation timings of some components of the LED display device including the shorted LED.

Accordingly, as shown in FIG. 7, after the first scan switch SW1 connected to the target scan line SL1 is turned off, the first precharge switch PSW1 connected to the target scan line SL1 is turned off, and thus the target scan line SL1 is in a floating state. Accordingly, the target scan line SL1 to which the shorted LED L11 is connected maintains the floating state until the target scan line SL1 is driven again. In the floating state, a voltage of the target scan line SL1 can be maintained at a level lower than a scan-off voltage, which is a voltage when the first scan switch SW1 connected to the target scan line SL1 is turned off and a level higher than the ground which is a voltage when the scan switch is turned on.

Meanwhile, when the shorted LED L11 emits light, the data controller 126 can block the supply of the channel current through the target channel line CL1 to which the shorted LED L11 is connected on the basis of the location information of the shorted LED L11 transmitted from the short detection circuits 260_1 to 260_3. To this end, as shown in FIG. 7, when the shorted LED L11 emits light, the data controller 126 can generate the first PWM control signal PWM_1 for turning off the first PWM switch 230_1 of the target channel line CL1 to which the shorted LED L11 is connected. Accordingly, the supply of the channel current to the shorted LED L11 is blocked.

In one embodiment, when the shorted LED L11 emits light, the data controller 126 can also block a supply of the reference voltage VOFF through the target channel line CL1 to which the shorted LED L11 is connected. According to this example, as shown in FIG. 7, when the shorted LED L11 emits light, the first channel voltage V_CH1 of the target channel line CL1 to which the shorted LED L11 is connected can be maintained at a level of the ground GND. To this end, when the shorted LED L11 emits light, the data controller 126 can generate a first reference voltage application signal RVS_1 for turning off the first reference voltage application switch 250_1 of the target channel line CL1 to which the shorted LED L11 is connected and transmit the first reference voltage application signal RVS_1 to the first reference voltage application switch 250_1.

As described above, according to the present disclosure, when the shorted LED L11 is detected by the short detection circuits 260_1 to 260_3, the data controller 126 can turn off the first precharge switch PSW_1 connected to the target scan line SL1 to which the shorted LED L11 is connected, thereby maintaining the target scan line SL1 in the floating state, and can simultaneously turn off the first PWM switch 230_1 of the target channel line CL1 to which the shorted LED L11 is connected, thereby blocking the supply of the channel current through the target channel line CL1, and thus occurrence of a phenomenon in which all the LEDs connected to the target channel line CL1 become bright or dim due to the shorted LED L11 can be prevented.

Meanwhile, in order to maximize the effect of preventing the image quality defects, the LED display driving circuit 120 according to one embodiment of the present disclosure can further include a brightness compensation circuit 130.

Specifically, when the shorted LED L11 occurs, due to the floating of the target scan line SL1 by the data controller 126, as shown in FIG. 7, when other normal LEDs L12 to L13 connected to the target channel line CL1 are driven, a time in which the first channel voltage V_CH1 increases from the reference voltage to the maximum value can be longer than when the shorted LED does not occur. That is, when any one of the scan lines SL2 and SL3 excluding the target scan line SL1 is selected, the brightness compensation circuit 130 can determine to compensate brightness of normal LEDs connected to the target channel line CL1 when an increasing inclination of the first channel voltage V_CH1 of the target channel line CL1 is smaller than a reference inclination in the case in which no shorted LED occurs.

According to the above-described example, the brightness of the normal LEDs L12 and L13 connected to the target channel line CL1 can be compensated for using the brightness compensation circuit 130 during light emission periods of the normal LEDs.

Specifically, the brightness compensation circuit 130 can compensate the brightness of the normal LEDs L12 and L13 connected to the target channel line CL1 using the first channel voltage V_CH1 of the target channel line CL1.

Figure 8A:
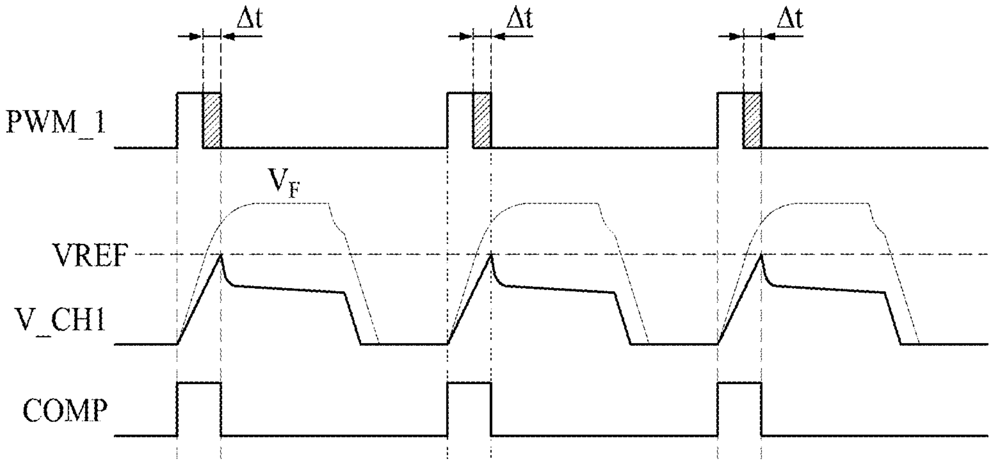
FIG. 8A is a waveform diagram conceptually illustrating a method of calculating a brightness compensation amount by a brightness compensation circuit according to one embodiment of the present disclosure.

In one embodiment, as shown in FIG. 8A, the brightness compensation circuit 130 can generate a comparison signal COMP by comparing the first channel voltage V_CH1 of the target channel line CL1 with a predetermined reference voltage VREF and generate a brightness compensation amount Δt as a time Δt corresponding to a difference between the comparison signal COMP and the first PWM signal PWM_1 to be supplied to the first PWM switch 230_1 of the target channel line CL1. The brightness compensation circuit 130 provides the brightness compensation amount Δt to the data controller 126, and the data controller 126 generates a final first PWM control signal PWM_1' by increasing an ON period of the first PWM control signal PWM_1 to be supplied to the first PWM switch 230_1 of the target channel line CL1 as much as the brightness compensation amount Δt and supplies the generated final first PWM control signal PWM_1' to the first PWM switch 230_1 of the target channel line CL1. Accordingly, the first PWM switch 230_1 connected to the target channel line CL1 is additionally turned on as much as the brightness compensation amount Δt, and thus a time for which the first channel voltage V_CH1 is maintained at the maximum value when the normal LEDs L12 and L13 emit light increases as much as the brightness compensation amount Δt so that the brightness of the normal LEDs L12 and L13 can increase.

Hereinafter, a configuration of the brightness compensation circuit 130 according to one embodiment of the present disclosure for implementing the above-described functions will be described in more detail with reference to FIG. 8B.

Figure 8B:
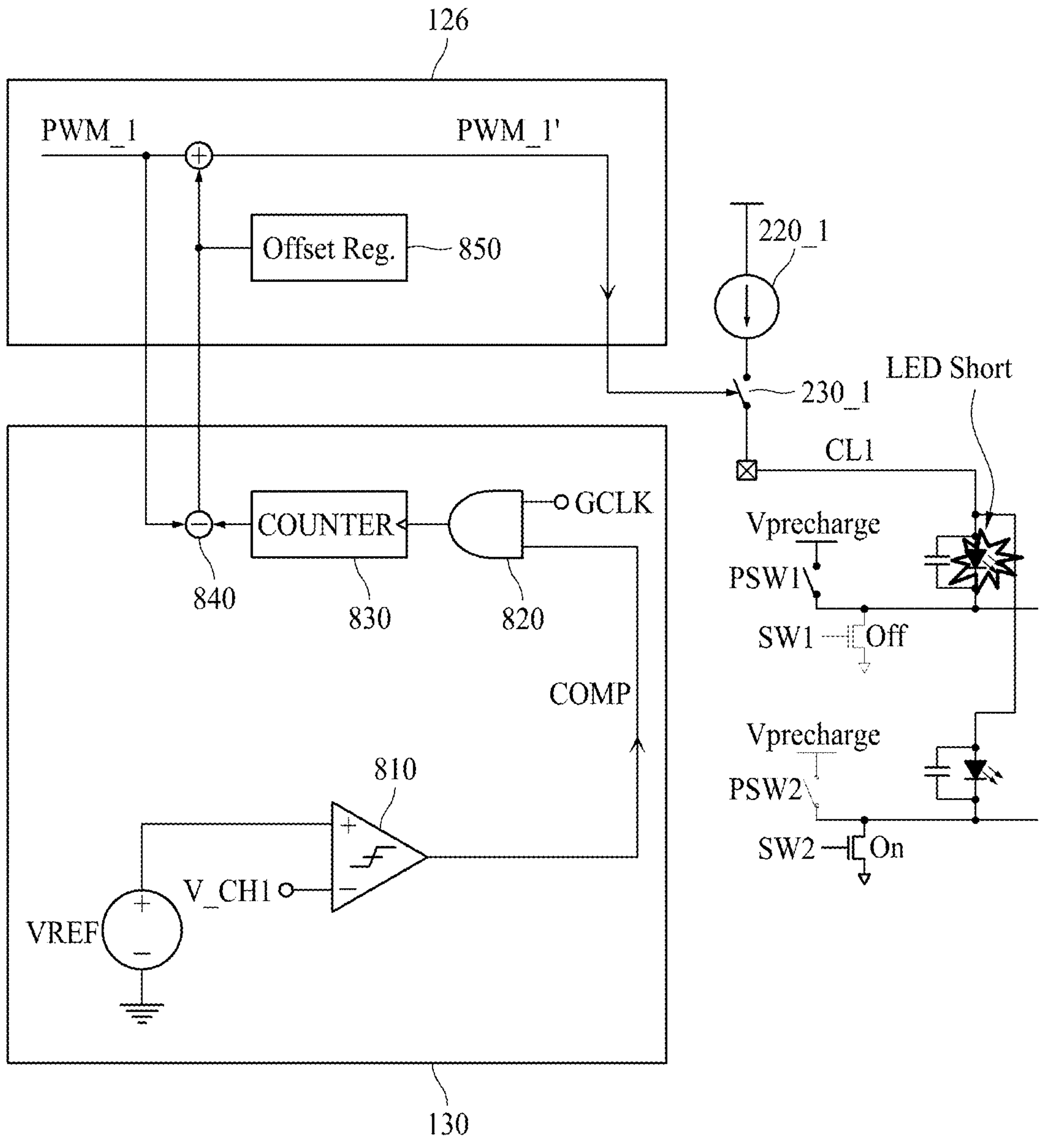
FIG. 8B is a block diagram illustrating a configuration of the brightness compensation circuit according to one embodiment of the present disclosure.

FIG. 8B is a block diagram illustrating a configuration of the brightness compensation circuit according to one embodiment of the present disclosure. As shown in FIG. 8B, the brightness compensation circuit 130 according to one embodiment of the present disclosure can include a comparator 810, a logical AND operator 820, a counter 830, and a subtractor 840.

The comparator 810 compares the reference voltage VREF with the first channel voltage V_CH1 of the target channel line CL1 to generate a comparison signal COMP. For example, the comparator 810 outputs a comparison signal COMP at a high level when the reference voltage VREF is greater than the first channel voltage V_CH1 of the target channel line CL1 and a comparison signal COMP at a low level when the reference voltage VREF is less than or equal to the first channel voltage V_CH1 of the target channel line CL1.

The logical AND operator 820 performs a logical AND operation on the comparison signal COMP output from the comparator 810 and the internal clock GCLK. Accordingly, only a period in which the comparison signal COMP is at a high level can be output in synchronization with the internal clock GCLK.

The counter 830 counts the number of clocks output from the logical AND operator 820, i.e., the number of clocks during which the comparison signal COMP remains at a high level.

The subtractor 840 calculates the brightness compensation amount Δt by calculating a difference between an initial first PWM control signal PWM_1 to be supplied to the first PWM switch of the target channel line CL1 and the counting value output from the counter 830. The subtractor 840 provides the calculated brightness compensation amount Δt to the data controller 126.

The data controller 126 increases an ON period of the initial first PWM control signal PWM_1 to be supplied to the first PWM switch 230_1 of the target channel line CL1 as much as the brightness compensation amount Δt to generate a final first PWM control signal PWM_1' and supplies the final first PWM control signal PWM_1' to the first PWM switch 230_1 of the target channel line CL1. Accordingly, as shown in FIG. 7, the first PWM switch 230_1 connected to the target channel line CL1 is additionally turned on as much as the brightness compensation amount Δt, and thus a time for which the first channel voltage V_CH1 is maintained at the maximum value when the normal LEDs L12 and L13 emit light increases as much as the brightness compensation amount Δt so that the brightness of the normal LEDs L12 and L13 can increase.

Meanwhile, as shown in FIG. 8B, when the final first PWM control signal PWM_1' is generated, the data controller 126 can additionally reflect an offset value stored in an offset register 850 in the final first PWM control signal PWM_1'.

Although it has been described that the ON period of the initial first PWM control signal PWM_1 increases as much as the brightness compensation amount Δt in the above-described example, the ON period of the initial first PWM control signal PWM_1 can also decrease as much as the brightness compensation amount Δt.

Although it has been described that the first channel voltage V_CH1 of the target channel line CL1 is compared with the reference voltage VREF in the above-described example, in another example, the first channel voltage V_CH1 of the target channel line CL1 can be compared with a channel voltage of a normal channel line adjacent to the target channel line CL1. Hereinafter, the description will be made assuming that the second channel line CL2 adjacent to the target channel line CL1 is a normal channel line.

Figure 9A:
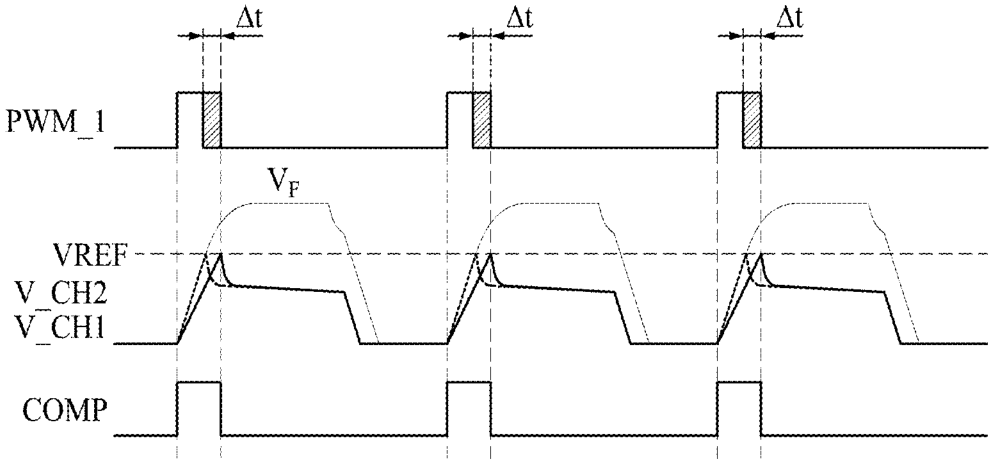
FIG. 9A is a waveform diagram conceptually illustrating a method of calculating a brightness compensation amount by a brightness compensation circuit according to another embodiment of the present disclosure.

Specifically, as shown in FIG. 9A, the brightness compensation circuit 130 can generate a comparison signal COMP by comparing the first channel voltage V_CH1 of the target channel line CL1 with a second channel voltage V_CH2 of the normal channel line CL2 and generate a brightness compensation amount Δt as a time Δt corresponding to a difference between the comparison signal COMP and an initial first PWM signal PWM_1 to be supplied to the first PWM switch 230_1 of the target channel line CL1. The brightness compensation circuit 130 provides the brightness compensation amount Δt to the data controller 126, and the data controller 126 generates a final first PWM control signal PWM_1' by increasing an ON period of the first PWM control signal PWM_1 to be supplied to the first PWM switch 230_1 of the target channel line CL1 as much as the brightness compensation amount Δt and supplies the generated final first PWM control signal PWM_1' to the first PWM switch 230_1 of the target channel line CL1.

Accordingly, the first PWM switch 230_1 connected to the target channel line CL1 is additionally turned on as much as the brightness compensation amount Δt, and thus a time for which the first channel voltage V_CH1 is maintained at the maximum value when the normal LEDs L12 and L13 emit light increases as much as the brightness compensation amount Δt so that the brightness of the normal LEDs L12 and L13 can increase.

Hereinafter, a configuration of a brightness compensation circuit 130 according to another embodiment of the present disclosure for implementing the above-described functions will be described in more detail with reference to FIG. 9B.

Figure 9B:
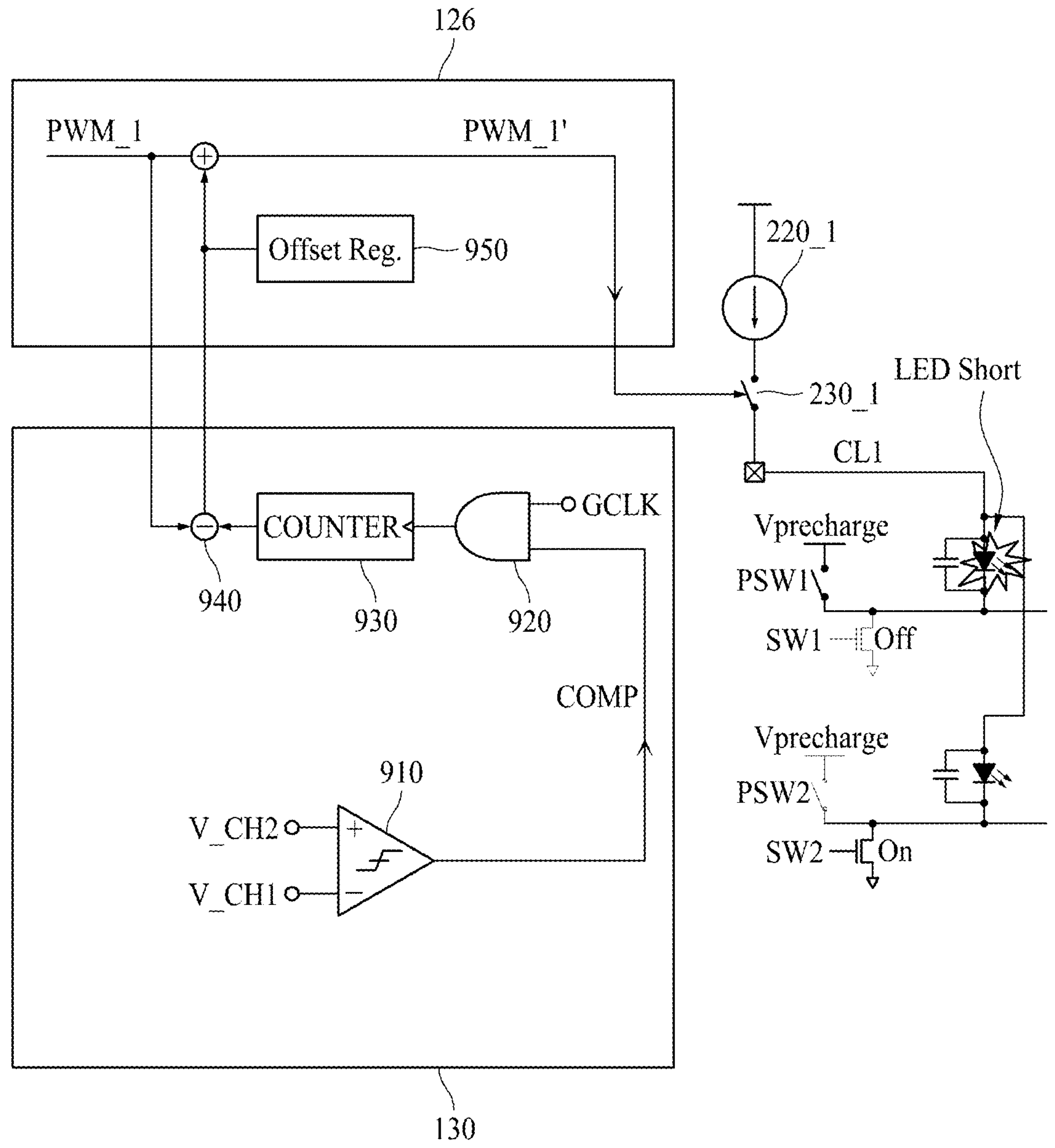
FIG. 9B is a block diagram illustrating a configuration of the brightness compensation circuit according to another embodiment of the present disclosure.

FIG. 9B is a block diagram illustrating a configuration of the brightness compensation circuit according to another embodiment of the present disclosure. As shown in FIG. 9B, the brightness compensation circuit 130 according to another embodiment of the present disclosure can include a comparator 910, a logical AND operator 920, a counter 930, and a subtractor 940.

The comparator 910 compares the first channel voltage V_CH1 of the target channel line CL1 with the second channel voltage V_CH2 of the normal channel line CL2 to generate a comparison signal COMP. For example, the comparator 910 outputs a comparison signal COMP at a high level when the second channel voltage V_CH2 of the normal channel line CL2 is greater than the first channel voltage V_CH1 of the target channel line CL1 and a comparison signal COMP at a low level when the second channel voltage V_CH2 of the normal channel line CL2 is less than or equal to the first channel voltage V_CH1 of the target channel line CL1.

The logical AND operator 920 performs a logical AND operation on the comparison signal COMP output from the comparator 910 and the internal clock GCLK. Accordingly, only a period in which the comparison signal COMP is at a high level can be output in synchronization with the internal clock GCLK.

The counter 930 counts the number of clocks output from the logical AND operator 920, i.e. the number of clocks during which the comparison signal COMP remains at a high level.

The subtractor 940 calculates the brightness compensation amount Δt by calculating a difference between an initial first PWM control signal PWM_1 to be supplied to the first PWM switch 230_1 of the target channel line CL1 and the counting value output from the counter 930. The subtractor 940 provides the calculated brightness compensation amount Δt to the data controller 126.

The data controller 126 increases an ON period of the initial first PWM control signal PWM_1 to be supplied to the first PWM switch 230_1 of the target channel line CL1 as much as the brightness compensation amount Δt to generate a final first PWM control signal PWM_1' and supplies the final first PWM control signal PWM_1' to the first PWM switch 230_1 of the target channel line CL1. Accordingly, the first PWM switch 230_1 connected to the target channel line CL1 is additionally turned on as much as the brightness compensation amount Δt, and thus a time for which the first channel voltage V_CH1 is maintained at the maximum value when the normal LEDs L12 and L13 emit light increases as much as the brightness compensation amount Δt so that the brightness of the normal LEDs L12 and L13 can increase.

Meanwhile, as shown in FIG. 9B, when the final first PWM control signal PWM_1' is generated, the data controller 126 can additionally reflect an offset value stored in an offset register 950 in the final first PWM control signal PWM_1'.

Although it has been described that the ON period of the initial first PWM control signal PWM_1 increases as much as the brightness compensation amount Δt in the above-described example, the ON period of the initial first PWM control signal PWM_1 can also decrease as much as the brightness compensation amount Δt.

Figure 10A:
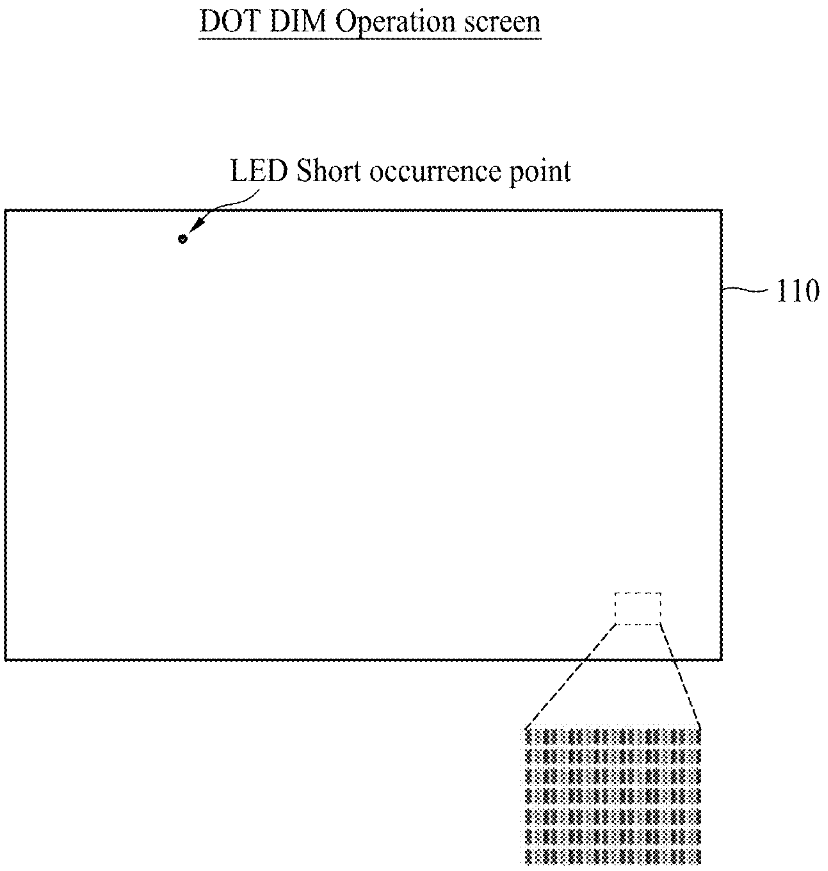
FIGS. 10A and 10B are diagrams illustrating a dot dim phenomenon in which only a shorted LED does not emit light.
Figure 10B:
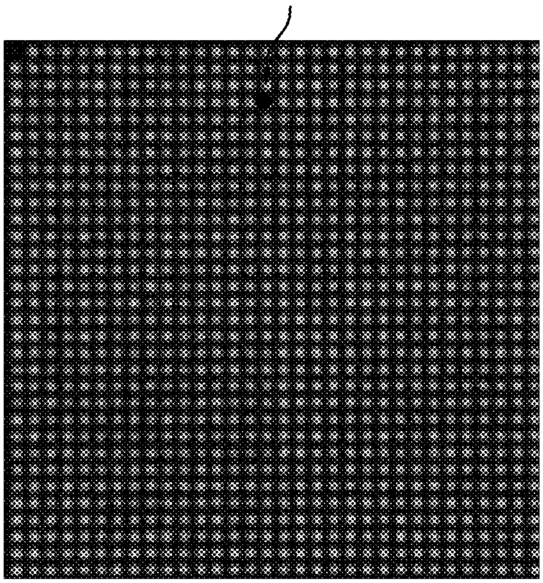

As described above, according to the present disclosure, as shown in FIGS. 10A and 10B, only a dot defect (Dot Dim) which causes only the shorted LED to not emit light occurs, and a line defect (Line Dim) which causes the brightness of all other normal LEDs connected to the target channel line to which the shorted LED is connected to be changed is prevented so that there is an effect of being able to exhibit a picture quality close to normal without repairing or replacing the shorted LED.

According to the present disclosure, by floating a target scan line connected to a shorted light-emitting diode (LED) during a non-light emission period of the shorted LED, only a dot defect (Dot Dim) which causes only the shorted LED to not emit light occurs, and a line defect (Line Dim) which causes the brightness of all other normal LEDs connected to the target channel line to which the shorted LED is connected to be changed is prevented so that there is an effect of being able to exhibit a picture quality close to normal without repairing or replacing the shorted LED.

In addition, according to the present disclosure, when a normal LED connected to the target channel line emits light, brightness of the normal LED can be compensated by compensating a pulse width modulation (PWM) control signal for emitting light of the normal LED so that there is an effect of being able to prevent occurrence of an image quality defect due to a short of an LED.

It will be apparent to those skilled in the art that various modifications and variations can be made in the present disclosure without departing from the spirit or scope of the disclosures. Thus, it is intended that the present disclosure covers the modifications and variations of this disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A light-emitting diode (LED) display driving circuit comprising:

a channel driving circuit configured to supply a channel current to each of a plurality of channel lines according to a pulse width modulation (PWM) control signal and allow a plurality of LEDs connected to each channel line to emit light;

a scan driving circuit including a plurality of scan switches connected to a plurality of scan lines and selectively turned on or off according to a scan signal to select a scan line connected to LEDs to emit light, and a plurality of precharge switches connected to the plurality of scan lines and configured to operate complementarily with the scan switches according to a precharge control signal, and turned on when each of the scan switches is turned off to supply a precharge voltage to a corresponding scan line; and a data controller configured to generate the PWM control signal, the scan signal, and the precharge control signal and maintain a target scan line in a floating state by turning off a precharge switch connected to the target scan line when the scan switch of the target scan line to which a shorted LED is connected is turned off when the shorted LED among the plurality of LEDs is detected, wherein the channel driving circuit includes:

a plurality of channel current sources disposed for each of the channel lines and configured to generate a channel current to be supplied through each channel line using an externally supplied voltage;

a plurality of PWM switches connected between the channel lines and the channel current sources and turned on or off according to the PWM control signal to control an amount of the channel current supplied to each channel line; and a short detection circuit configured to detect the shorted LED among the plurality of LEDs, and wherein the data controller generates the PWM control signal for turning off a PWM switch of a target channel line to which the shorted LED is connected during a turn-on period of the scan switch of the target scan line.

2. The LED display driving circuit of claim 1, wherein the short detection circuit determines whether each LED is shorted based on a channel voltage of each channel line according to the channel current supplied through each channel line when a specific scan line is selected by the scan driving circuit.

3. The LED display driving circuit of claim 2, wherein the short detection circuit detects an LED connected to a channel line having a channel voltage that is smaller than a predetermined reference voltage as the shorted LED.

4. The LED display driving circuit of claim 1, further comprising a brightness compensation circuit configured to compensate brightness of normal LEDs connected to the target channel line to which the shorted LED is connected, when any one of the scan lines excluding the target scan line is selected and when an increasing inclination in a channel voltage due to the channel current supplied to the target channel line is smaller than a reference inclination.

5. The LED display driving circuit of claim 4, wherein:

the brightness compensation circuit generates a comparison signal by comparing the channel voltage of the target channel line with a predetermined reference voltage and calculates a difference between the comparison signal and an initial PWM control signal for the target channel line as a brightness compensation amount; and the data controller generates the PWM control signal for controlling a PWM switch connected to the target channel line by adjusting an ON period of the initial PWM control signal as much as the brightness compensation amount.

6. The LED display driving circuit of claim 5, wherein the brightness compensation circuit comprises:

a comparator configured to compare the predetermined reference voltage with the channel voltage of the target channel line to generate the comparison signal;

a logical AND operator configured to performs a logical AND operation on the comparison signal output from the comparator and an internal clock;

a counter configured to count the number of clocks during which an AND operation result output from the logical AND operator remains at a high level; and a subtractor configured to calculate a difference between the initial PWM control signal and a counting value output from the counter as the brightness compensation amount.

7. The LED display driving circuit of claim 4, wherein:

the brightness compensation circuit generates a comparison signal by comparing the channel voltage of the target channel line with a channel voltage of a normal channel line adjacent to the target channel line and calculates a difference between the comparison signal and an initial PWM control signal for the target channel line as a brightness compensation amount; and the data controller generates the PWM control signal for controlling a PWM switch connected to the target channel line by adjusting an ON period of the initial PWM control signal as much as the brightness compensation amount.

8. The LED display driving circuit of claim 7, wherein the brightness compensation circuit comprises:

a comparator configured to compare the channel voltage of the normal channel line with the channel voltage of the target channel line to generate the comparison signal;

a logical AND operator configured to performs a logical AND operation on the comparison signal output from the comparator and an internal clock;

a counter configured to count the number of clocks during which an AND operation result output from the logical AND operator remains at a high level; and a subtractor configured to calculate a difference between the initial PWM control signal and a counting value output from the counter as the brightness compensation amount.

9. The LED display driving circuit of claim 1, wherein, when a specific scan line is selected by the scan driving circuit, a channel voltage of each channel line according to the channel current supplied through each channel line increases from a reference voltage level higher than a ground level according to a supply of the channel current and decreases to the reference voltage level when the supply of the channel current is stopped.

10. A light-emitting diode (LED) display device comprising:

a display panel including a plurality of LEDs disposed in a plurality of sub-pixels where a plurality of channel lines and a plurality of scan lines intersect; and an LED display driving circuit configured to supply a channel current to the plurality of LEDs and allow the plurality of LEDs to emit light, wherein the LED display driving circuit includes:

a channel driving circuit configured to supply the channel current through each channel line according to a pulse width modulation (PWM) control signal;

a scan driving circuit including a plurality of scan switches connected to a plurality of scan lines and selectively turned on or off according to a scan signal to select a scan line connected to LEDs to emit light, and a plurality of precharge switches connected to the plurality of scan lines and configured to operate complementarily with the scan switches according to a precharge control signal, and turned on when each of the scan switches is turned off to supply a precharge voltage to a corresponding scan line; and a data controller configured to generate the PWM control signal, the scan signal, and the precharge control signal and maintain a target scan line in a floating state by turning off a precharge switch connected to the target scan line when the scan switch of the target scan line to which a shorted LED is connected is turned off when the shorted LED among the plurality of LEDs is detected, wherein the channel driving circuit includes:

a plurality of channel current sources disposed for each of the channel lines and configured to generate a channel current to be supplied through each channel line using an externally supplied voltage;

a plurality of PWM switches connected between the channel lines and the channel current sources and turned on or off according to the PWM control signal to control an amount of the channel current supplied to each channel line; and a short detection circuit configured to detect the shorted LED among the plurality of LEDs, and wherein the data controller generates the PWM control signal for turning off a PWM switch of a target channel line to which the shorted LED is connected during a turn-on period of the scan switch of the target scan line.

11. The LED display device of claim 10, wherein, the LED display driving circuit includes a brightness compensation circuit configured to compensate brightness of normal LEDs connected to the target channel line to which the shorted LED is connected, when any one of the scan lines excluding the target scan line is selected and when an increasing inclination in a channel voltage due to the channel current supplied to the target channel line is smaller than a reference inclination.

12. The LED display device of claim 11, wherein:

the brightness compensation circuit generates a comparison signal by comparing a predetermined reference voltage with the channel voltage of the target channel line and calculates a difference between the comparison signal and an initial PWM control signal for the target channel line as a brightness compensation amount; and the data controller generates the PWM control signal for controlling a PWM switch connected to the target channel line by adjusting an ON period of the initial PWM control signal as much as the brightness compensation amount.

13. The LED display device of claim 12, wherein the brightness compensation circuit comprises:

a comparator configured to compare the predetermined reference voltage with the channel voltage of the target channel line to generate the comparison signal;

a logical AND operator configured to performs a logical AND operation on the comparison signal output from the comparator and an internal clock;

a counter configured to count the number of clocks during which an AND operation result output from the logical AND operator remains at a high level; and a subtractor configured to calculate a difference between the initial PWM control signal and a counting value output from the counter as the brightness compensation amount.

14. The LED display device of claim 11, wherein:

the brightness compensation circuit generates a comparison signal by comparing the channel voltage of the target channel line with a channel voltage of a normal channel line adjacent to the target channel line and calculates a difference between the comparison signal and an initial PWM control signal for the target channel line as a brightness compensation amount; and the data controller generates the PWM control signal for controlling a PWM switch connected to the target channel line by adjusting an ON period of the initial PWM control signal as much as the brightness compensation amount.

15. The LED display device of claim 14, wherein the brightness compensation circuit comprises:

a comparator configured to compare the channel voltage of the normal channel line with the channel voltage of the target channel line to generate the comparison signal;

a logical AND operator configured to performs a logical AND operation on the comparison signal output from the comparator and an internal clock;

a counter configured to count the number of clocks during which an AND operation result output from the logical AND operator remains at a high level; and a subtractor configured to calculate a difference between the initial PWM control signal and a counting value output from the counter as the brightness compensation amount.

16. The LED display device of claim 10, wherein the short detection circuit determines whether each LED is shorted based on a channel voltage of each channel line according to the channel current supplied through each channel line when a specific scan line is selected by the scan driving circuit.

17. The LED display device of claim 16, wherein the short detection circuit detects an LED connected to a channel line having a channel voltage that is smaller than a predetermined reference voltage as the shorted LED.

18. The LED display driving circuit of claim 10, wherein, when a specific scan line is selected by the scan driving circuit, a channel voltage of each channel line according to the channel current supplied through each channel line increases from a reference voltage level higher than a ground level according to a supply of the channel current and decreases to the reference voltage level when the supply of the channel current is stopped.

19. A light-emitting diode (LED) display device comprising:

a display panel including a plurality of LEDs disposed in a plurality of sub-pixels where a plurality of channel lines and a plurality of scan lines intersect; and an LED display driving circuit configured to supply a channel current to the plurality of LEDs and allow the plurality of LEDs to emit light, wherein the LED display driving circuit includes:

a channel driving circuit configured to supply the channel current through each channel line according to a pulse width modulation (PWM) control signal;

a scan driving circuit including a plurality of scan switches connected to a plurality of scan lines and selectively turned on or off according to a scan signal to select a scan line connected to LEDs to emit light, and a plurality of precharge switches connected to the plurality of scan lines and configured to operate complementarily with the scan switches according to a precharge control signal, and turned on when each of the scan switches is turned off to supply a precharge voltage to a corresponding scan line; and a data controller configured to generate the PWM control signal, the scan signal, and the precharge control signal and maintain a target scan line in a floating state by turning off a precharge switch connected to the target scan line when the scan switch of the target scan line to which a shorted LED is connected is turned off when the shorted LED among the plurality of LEDs is detected, wherein the channel driving circuit includes a short detection circuit configured to detect the shorted LED among the plurality of LEDs, and the short detection circuit determines whether each LED is shorted based on a channel voltage of each channel line according to the channel current supplied through each channel line when a specific scan line is selected by the scan driving circuit.

* * * * *